Oct. 22, 1929.                    C. R. CAMMER                    1,732,964
                              HOOD HINGE PROTECTOR
                              Filed Dec. 26, 1928
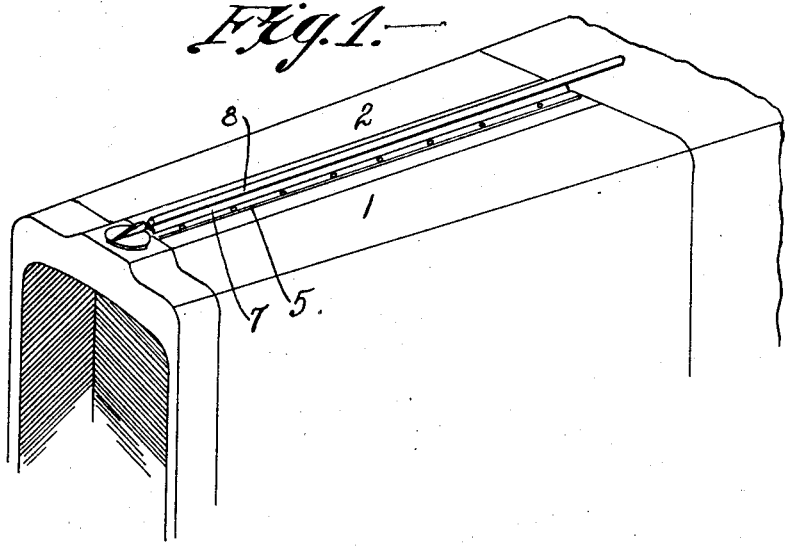
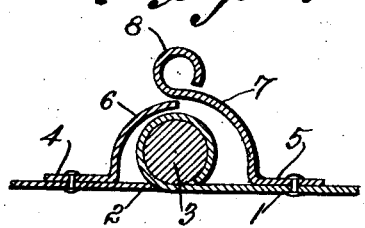  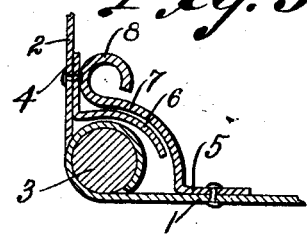
Charles R. Cammer,
INVENTOR
BY Victor J. Evans
ATTORNEY
WITNESS:

Patented Oct. 22, 1929

1,732,964

UNITED STATES PATENT OFFICE

CHARLES R. CAMMER, OF SYRACUSE, NEW YORK

HOOD-HINGE PROTECTOR

Application filed December 26, 1928. Serial No. 328,390.

The object of this, my present invention, is the provision of a simple device designed to be fixed on the sections of a hood of an automobile to add to the ornamentality thereof; to serve as a protector for the hinge, to prevent water from seeping between the pintle and rounded ears of the hinge, and likewise to afford a raised portion at the said hinged connection of the hood sections, to give the same a higher effect.

To the attainment of the foregoing the invention consists in the improvement hereinafter described and definitely claimed.

In the drawings:

Figure 1 is a perspective view illustrating the application of my improvement.

Figure 2 is a detail transverse sectional view therethrough.

Figure 3 is a substantially similar view to Figure 2 but showing the hood raised on its hinge.

In Figure 1 of the drawings I have shown a front of an automobile, the same, between the cowl and radiator casing being covered by the usual hood. The hood, of course, is made up of two sections, 1 and 2, respectively, and the confronting ends of these sections are rounded upon themselves to provide intersecting ears or barrels for the reception of the pivot rod 3.

On each of the sections 1 and 2 of the hood, adjacent to the hinge connection between the sections I secure the flanged portions 4 and 5 of oppositely directed upwardly rounded or arched plates 6 and 7, respectively. The cross sectionally rounded portion of the plate 6 is received below but arranged only slightly out of contact with the arched or rounded portion of the plate 7. The plate 7 has its outer end extending a suitable distance beyond the edge of the plate 6 and this edge of the said plate 7 is rounded to provide the same with a bead 8 which adds to the ornamentality of the improvement.

The plates may be highly polished and by reference to the drawings it will be seen that the hinges between the hood sections are fully enclosed by the arched portions of the plates 6 and 7. Also by reference to the drawings it will be noted that the plates afford a water shield so that rain or water will be directed away from the hinge connection of the hood sections and consequently short circuiting of the spark plugs of the engine will be effectively prevented.

As disclosed by Figure 3 the bead serves as a stop for the hood section 2 when the latter is raised and this bead 8 will rest upon the flange 4 of the arched plate 6 when the section 1 of the hood is raised, so that either of such sections will be more effectively sustained in such raised condition.

The simplicity of the improvement and the advantages thereof will, it is thought, be understood and appreciated so that further detailed description will not be required.

Having described the invention, I claim:

1. An ornamental protector for the hinge sections of the hood of an automobile, comprising cross sectionally arched plates having flanged ends which are secured to the respective hood sections, and one of said arched plates being received in and arranged slightly out of contact with the second arched plate.

2. An ornamental protector for the hinge sections of the hood of an automobile, comprising cross sectionally arched plates having flanged ends which are secured to the respective hood sections, and one of said arched plates being received in and arranged slightly out of contact with the second arched plate and the outer edge of the second arched plate being rounded upon itself to provide a bead.

In testimony whereof I affix my signature.

CHARLES R. CAMMER.